(12) United States Patent
Chiu (10) Patent No.: US 8,111,737 B2
(45) Date of Patent: Feb. 7, 2012

(54) BIDIRECTIONAL DIGITAL COMMUNICATION CIRCUIT AND A BIDIRECTIONAL DIGITAL COMMUNICATION METHOD

(75) Inventor: Chia-Hung Chiu, Taipei (TW)

(73) Assignee: Wavesplitter Technologies, Inc., Fremont, CA (US)

( * ) Notice: Subject to any disclaimer, the term of this patent is extended or adjusted under 35 U.S.C. 154(b) by 551 days.

(21) Appl. No.: 12/403,386

(22) Filed: Mar. 13, 2009

(65) Prior Publication Data
US 2010/0232484 A1 Sep. 16, 2010

(51) Int. Cl.
*H03K 11/00* (2006.01)
(52) U.S. Cl. ........................................ 375/214; 375/219
(58) Field of Classification Search .................. 375/214, 375/219–222, 257
See application file for complete search history.

(56) References Cited

U.S. PATENT DOCUMENTS

| | | | | |
|---|---|---|---|---|
| 6,493,363 | B1 * | 12/2002 | Shuman et al. | 370/539 |
| 2005/0080954 | A1 * | 4/2005 | Castro et al. | 710/52 |
| 2005/0258865 | A1 * | 11/2005 | Behrendt et al. | 326/82 |
| 2007/0206643 | A1 * | 9/2007 | Egan et al. | 370/479 |
| 2008/0170604 | A1 * | 7/2008 | Komoda | 375/214 |

* cited by examiner

*Primary Examiner* — Emmanuel Bayard
(74) *Attorney, Agent, or Firm* — Leong C. Lei (57) ABSTRACT

A bidirectional digital communication circuit and a bidirectional digital communication method for combining multi-channel signals to a duplex digital communication system apply time division multiplexing. The signals can be unidirectional and bidirectional; signals relationship is not necessary. The direction detector circuit determines signal directional automatically to avoid the signal loop. It's suitable for applying to fiber, cable or wireless communication system which is needed to minimize the communication channels.

19 Claims, 10 Drawing Sheets

BIDIRECTIONAL DIGITAL COMMUNICATION CIRCUIT AND A BIDIRECTIONAL DIGITAL COMMUNICATION METHOD

BACKGROUND OF THE INVENTION (a) Technical Field of the Invention

The present invention is related to a bidirectional digital communication circuit and a bidirectional digital communication method, which are suitable for network and interface technology applied to digital communication systems such as fiber communication, digital wireless system and video system, or the like for example, HDMI (High Definition Multimedia Interface) and DVI (Digital Visual Interface) applications.

(b) Description of the Prior Art

Digital communications are widely applied for audio, video and data transmission, and data types are getting more and more complex. More and more protocols are developed to communicate two or more devices. Modern products may include two or more different protocols to be compatible with other products or old devices. It makes the modern communication device become more and more complex, too.

For example, the video interfaces, such as DVI and HDMI, always have huge data flow for uncompressed signals and other control channels to achieve the video transmission. The multi-channels interface makes the high cost, especially some special products need to include other functions, such like IR (Infrared) remote control, RS-232 (EIA-RS-232). People always want to have a powerful product that includes all functions in a small package. Therefore, how to establish reliable communications with minimum channels that meet cost effective and performance is a challenge.

There are some related arts are disclosed, such as US patent publication No. 2008/0152024 A1 (titled "Two-way communication circuit, two-way communication system, and communication method of two-way communication circuit"), US patent publication No. 2008/0201756 A1 (titled "Multi-media digital interface systems and methods) and US patent publication No. 2008/0247341 A1 (titled "Digital video interface with bi-directional half-duplex clock channel used as auxiliary data channel).

In US patent publication No. 2008/0152024 A1, the data transmission direction is controlled by the transmission and reception switch signal from communication controller. The transmission and reception circuit periodically switches the transmission direction and reception direction according to an indication by the communication controller depending on the control signal. The structure needs a higher-order LSI (Large Scale Integrated circuit) to be a master and other to be a target to determine the data flow and timing. The data with a different protocol can not communicate with it before data are converted to its format.

In US patent publication No. 2008/0201756 A1, the video channel, auxiliary channel, status channel and supply channel are combined together by frequency multiplexing. High pass, band pass and low pass filters are applied to separate and combine all channels. Various modulation schemes can be used in the system, such as PAM, QAM, etc., in order to maximize data throughput over the single media. However, more channels mean more precise RF (Radio Frequency) components and more crosstalk issue. The complex circuit design and high cost will be a big problem.

In US patent publication No. 2008/0247341 A1, the clock channel is used as an auxiliary data channel to transmit data as well as clock signals in a bidirectional, half-duplex manner using time division multiplexing (TDM). To use the structure, the system must have a clock channel and the repetitive V-Blank (Vertical Blank) is required. It is limited to some video communications only.

SUMMARY OF THE INVENTION

The primary purpose of the present invention is to provide a mechanism to apply in short reach for digital communications.

The mechanism is combining several half-duplex digital signals and unidirectional digital signals to one duplex digital channel. The half-duplex signals can be any protocols just like I2C (inter-integrated circuit), CEC (consumer electronics control).

A bidirectional digital communication circuit connected to a Physical Medium Dependent (PMD) element performing to combine a plurality of bidirectional channels and a plurality of unidirectional channels for digital communication is provided. The bidirectional digital communication circuit comprises: at least one direction detector circuit connecting at least one of the bidirectional channels for controlling data flow of the bidirectional channels; a TX data conversion circuit connecting the direction detector circuit and/or connecting at least one of the unibidirectional channels for inputting data therefrom, wherein the PMD element transmits the above data to a communication medium; and a RX data conversion circuit connecting the direction detector circuit and/or connecting at least one of the unibidirectional channels for separating data thereto, wherein the PMD element receives the above data from the communication medium.

The direction detector circuits are connected to half-duplex channels, TX data conversion circuit and RX data conversion circuit to determine the data flow. The unidirectional signals are connected to TX data conversion circuit for transmission and from RX data conversion circuit for reception, respectively. The TX data conversion circuit outputs the serial data to the PMD element for transmission and RX data conversion circuit receives the serial data from the PMD element for receiving, respectively.

A method of a bidirectional digital communication circuit connected to a physical medium dependent (PMD) element performing to combine a plurality of bidirectional channels and a plurality of bidirectional channels for digital communication is also provided. The method comprises: providing a RX data conversion mechanism, a TX data conversion mechanism and a direction detect mechanism for said one or more bidirectional channels and one or more unidirectional channels to communicate two systems thereby; obtaining detect signals for connecting the bidirectional channels to the direction detect mechanism to determine the signals from the RX data conversion mechanism go to the TX data conversion mechanism or coming from the RX data conversion mechanism; combining channels data to provide combined signals to the PMD element by the TX data conversion mechanism; and receiving signals from the PMD element by the RX data conversion mechanism to provide distributed signals to corresponding channels.

Six embodiments of the invention are provided in the following description; two are for conversion circuit and four are for detector circuits. The first embodiment of the invention includes a serialer as the TX data conversion circuit, a deserilaer as the RX data conversion circuit and at least one direction detector circuit.

The second embodiment of the invention includes a multiplexer and an alignment circuit as the TX data conversion circuit, a demultiplexer and an alignment circuit as the RX data conversion circuit and at least one directional detector circuit and at least one direction detector circuit.

Regarding the four embodiments of the invention for the direction detector circuit, one includes an inverter; driver stage and SPDT; one includes two SPDTs only and others include an inverter and two SPDTs with different positions.

All embodiments of the invention connect to the PMD element for transmitting and receiving data by duplex communication. The half-duplex signals need to be connected to direction detector circuit for data flow; unidirectional channels can be connected to TX or RX data conversion circuit directly. The duplex communication is achieved by Time Division Multiplexing (TDM) which is applied to keep the signals communication real time. It is easy to apply in short reach for wireless or two wires cable system and in long reach for fiber system.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
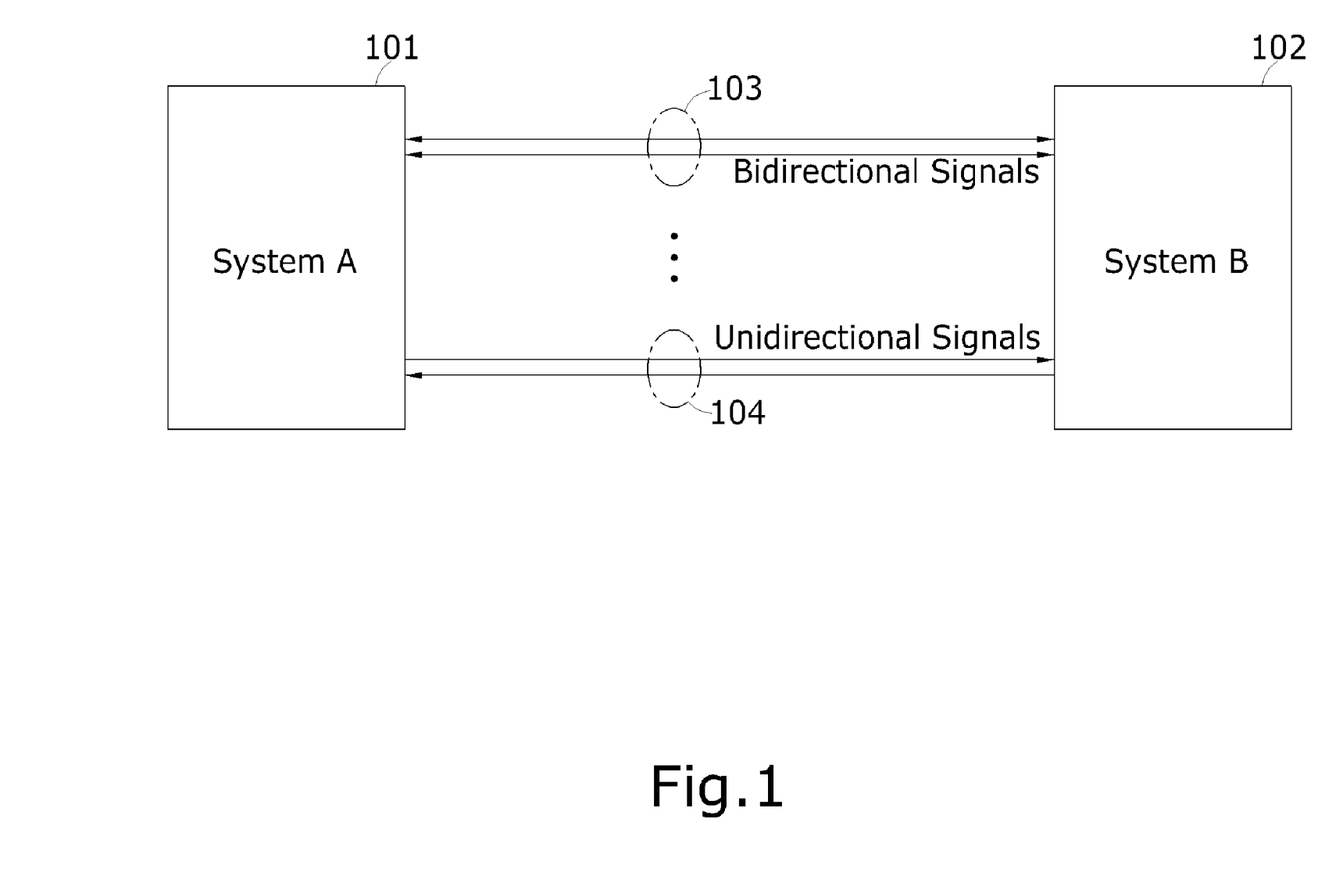
FIG. 1 is a diagram showing a communication example between system A and system B.

FIG. 1 shows the general application diagram of the system communication, wherein there are many signals between system A 101 and system B 102, some of them are bidirectional signals 103 like I2C, and some are unidirectional signals 104 like clock or status signals. To apply a rainbow cable to connect with two systems is a simple way. However, the cable size, transmission distance and crosstalk issues will be a big problem. In the meantime, the bidirectional signals 103 are provided from bidirectional channels, and the unidirectional signals 104 are provided from unibidirectional channels. In the following embodiments, at least one of the bidirectional channels is a half-duplex channel, but it not intended to limit the scope of the invention as described.

Figure 2:
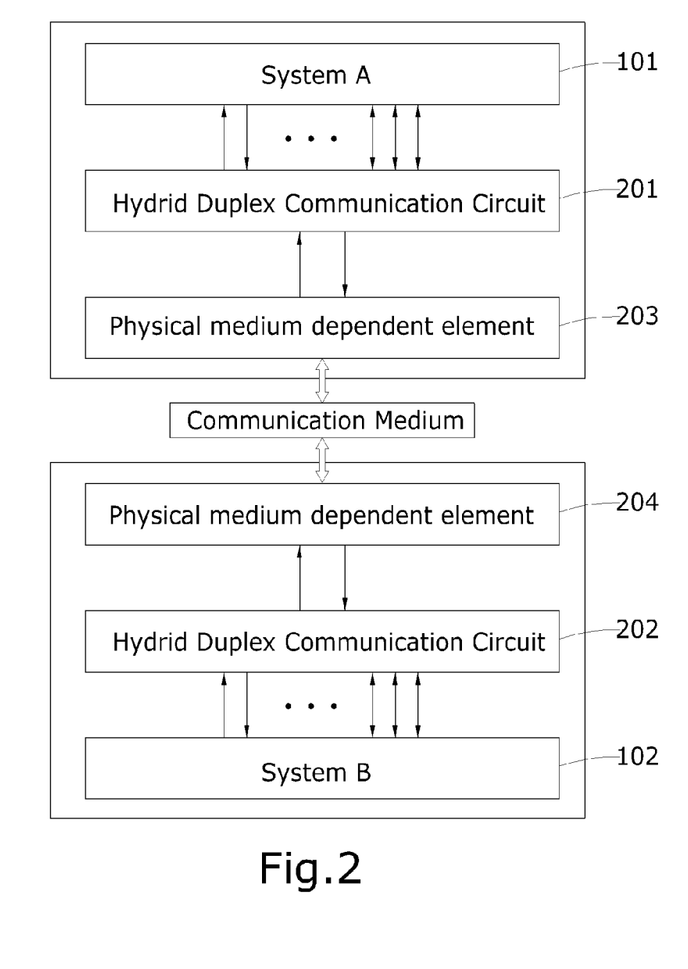
FIG. 2 is a diagram showing a constructional view of the embodiment for system communication with a hybrid duplex communication circuit.

FIG. 2 shows the invention concept for the system communication. Hybrid duplex communication circuits 201 and 202 combine all signals to a duplex communication system for a system A 101 and a system B 102. It should be noted that the TX data conversion mechanism can be a TX data conversion circuit, the hybrid duplex communication circuits 201 and 202 can be any channels that include bidirectional channels and/or unidirectional channels or substitutions that will serve the same functions. The combined signals can be easy to transmit to and receive from other system via Physical Medium Dependent (PMD) elements 203 and 204. The PMD elements 203 and 204 depend on a communication medium 205 and can be a Power Amplifier (PA) and antenna for the wireless system, a cable driver for two wires cable system, or a laser diode driver and a laser for the fiber system at transmitter side; it can be a Low Noise Amplifier (LNA) and antenna for wireless system, a cable equalizer for the cable system, or a Photo-Diode (PD) and a Trans-Impedance Amplifier (TIA) with a Limiting Amplifier (LIA) for the fiber system at receiver side.

Figure 3:
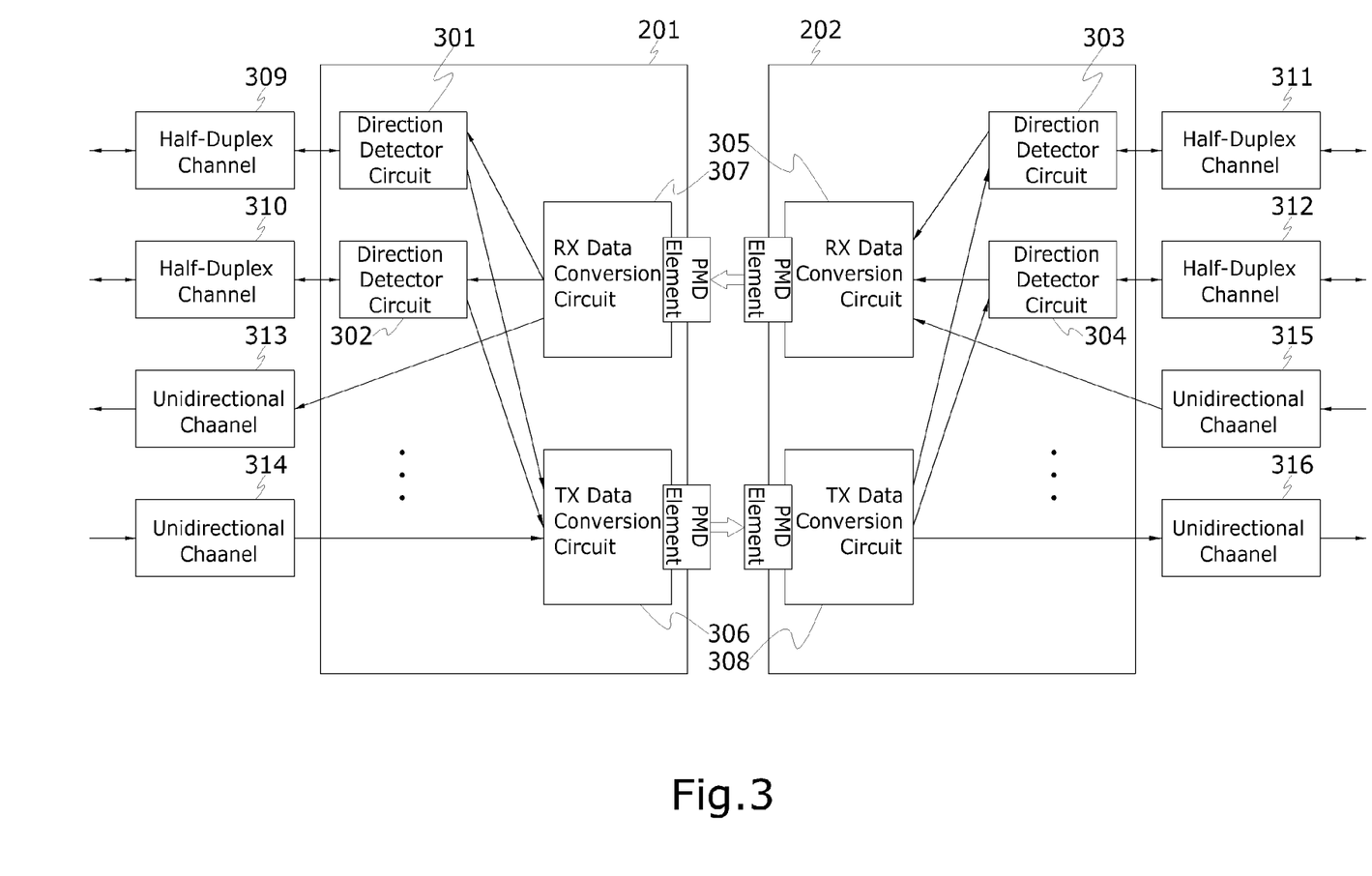
FIG. 3 is a diagram showing a constructional view of the embodiment of the hybrid duplex communication circuit.

FIG. 3 shows a constructional view of the embodiment for system communication with the invention. The hybrid duplex communication circuits 201 and 202 have same structures which contain three elements: at least one of direction detector circuits 301, 302, 303 and 304 for detecting the direction of signals, TX (Transmitter side) data conversion circuits 305 and 306 and RX (Receiver side) data conversion circuit 307 and 308.

The direction detector circuits 301, 302, 303 and 304 determine the signal direction to avoid the signal goes back and noise. The TX data conversion circuits 305 and 306 combines all signals which are needed to transmit to other system. The RX data conversion circuits 307 and 308 receive data and transfer the signals to corresponding channels. Half-duplex channels 309, 310, 311 and 312 connect to the direction detector circuits 301, 302, 303 and 304 which also connect to the TX data conversion circuit 305, the TX data conversion circuit 306, the RX data conversion circuit 307, and the RX data conversion circuit 308. The TX data conversion circuits 305 and 306 transmit all data to the interface and the RX data conversion circuits 307 and 308 receive all data from the interface. The unidirectional channels 313, 314, 315 and 316 connect to the TX data conversion circuits 305 and 306 to transmit or the RX data conversion circuits 307 and 308 for receiving directly.

The function of the TX data conversion circuits 305 and 306 are to combine all input signals to one channel and the RX data conversion circuits 307 and 308 are to separate received data to corresponding signal channels by the TDM respectively. The TX data conversion circuits 305 and 306 can be a serialer in embodiment 1 or a multiplexer with the channel alignment algorithm in embodiment 2, the RX data conversion circuits 307 and 308 can be a deserialer in embodiment 1 or a demultiplexer with the channel alignment algorithm in embodiment 2.

Figure 4:
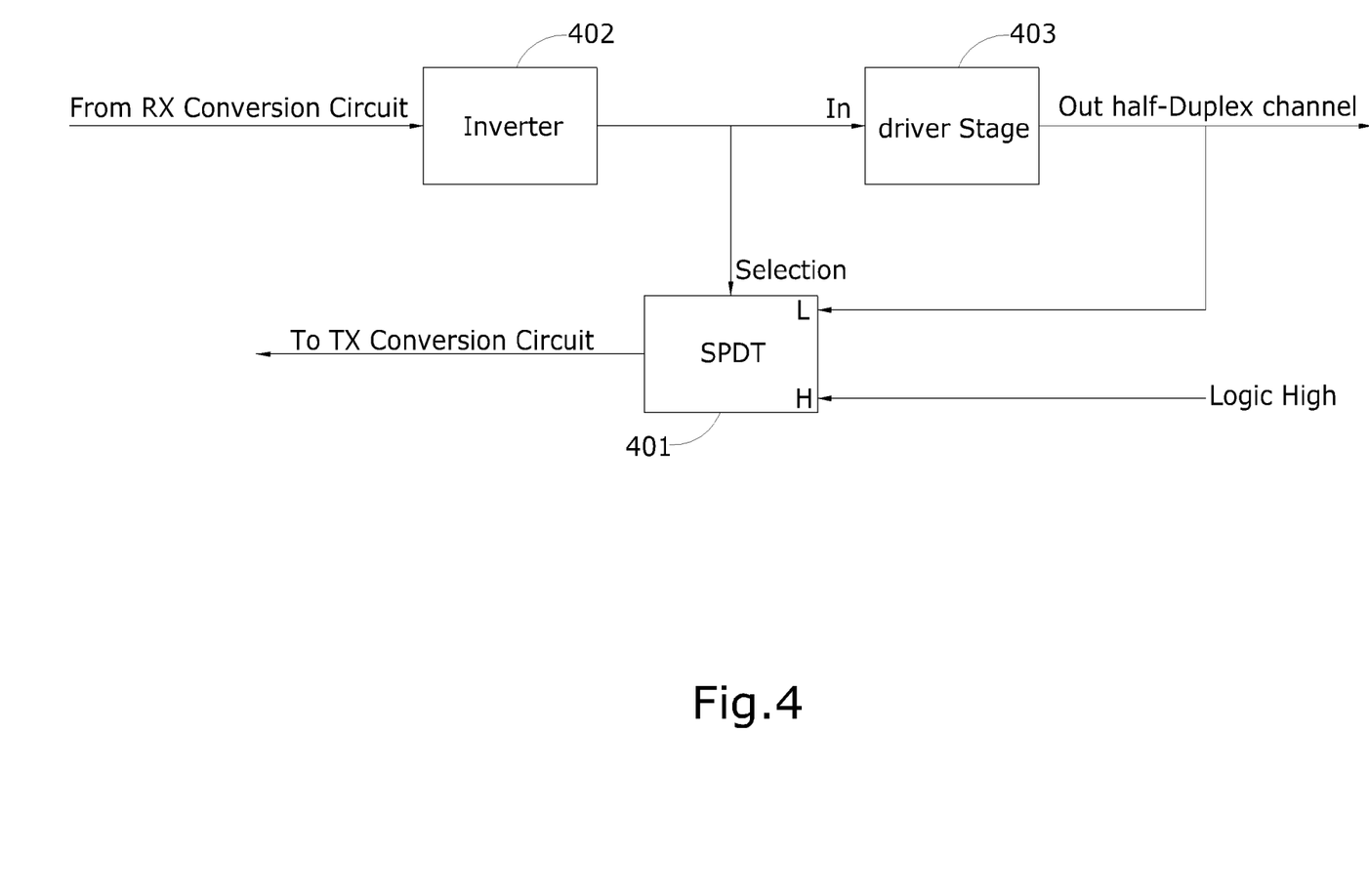
FIG. 4 is a diagram showing a constructional view of the first embodiment of a direction detector circuit.
Figure 5:
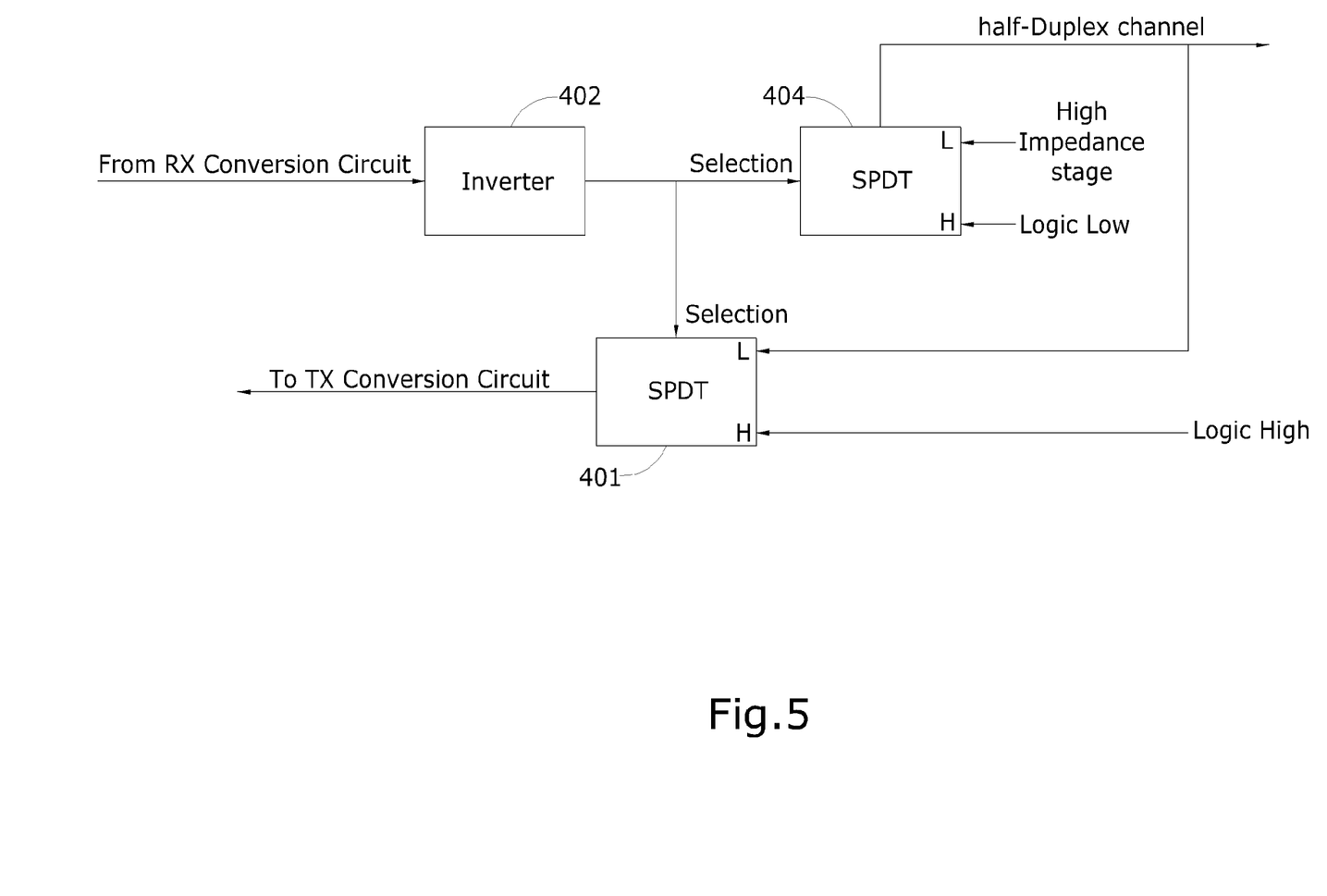
FIG. 5 is a diagram showing a constructional view of the second embodiment of a direction detector circuit.

FIG. 4 shows the constructional structure of the first embodiment of the direction detector circuits 301, 302, 303 and 304. In this embodiment, the direction detector circuit controlling the data flow comprises an inverter for receiving the data from the RX data conversion circuit, a driver stage for outputting the data from the inverter to at least one of the bidirectional channels, and a Single Pole Double Through (SPDT) for receiving the data from the RX data conversion circuit through the inverter to determine the input of the TX data conversion circuit. As shown in FIG. 5, there are three elements to control the signal flow. The signal form RX data conversion circuit goes to the selection pin of SPDT (Single Pole Double Through) 401 through an inverter 402 to determine the input of TX data conversion circuit. The inverter 402 can be a digital inverter. The half-duplex channel connects to the corresponding pin of the logic low of the selection pin. The driver stage 403 can be a FET (Field-Effect Transistor) or BJT (Bipolar Junction Transistor) component with a pull-up resistor to meet the output structure of standard I2C bus; it also can be other structure that can meet the logic algorithm. The direction detector circuit will pass the signal from a half-duplex channel to the TX data conversion circuit if the signal from the RX data conversion circuit is logic high. Otherwise, the direction detector circuit will transmit the signal that is from the RX data conversion circuit to the half-duplex channel.

FIG. 5 shows the constructional structure of the second embodiment of the direction detector circuits 301, 302, 303 and 304. In this embodiment, the direction detector circuit controlling the data flow is comprising an inverter for receiving the data from the RX data conversion circuit and two SPDTs, one SPDT (first SPDT) is provided for outputting the data from the inverter to the half-duplex channel, the other SPDT (second SPDT) is provided for receiving the data from the RX data conversion circuit through the inverter to be a selection signal to determine the input of the TX data conversion circuit which is from the bidirectional channel or logic high. As shown in FIG. 5, another SPDT (first SPDT) 404 is provided for replacing with the driver stage 403. The selection pin of the SPDT 404 is connected to the output of the inverter 402 to determine the common pin of the SPDT 404 to be connected to L (Low) or H (High) pin of SPDT 404. The L pin of the SPDT 404 is connected to be a high impedance stage; the H one is connected to logic low and the common pin of the SPDT 404 is connected to half-duplex channel. The SPDT (second SPDT) 401 is provided for receiving the data from the RX data conversion circuit through the inverter 402 to be the selection signal to determine the input of the TX data conversion circuit; it determines the input of the TX data conversion circuit is from the half-duplex channel or logic high.

Figure 6:
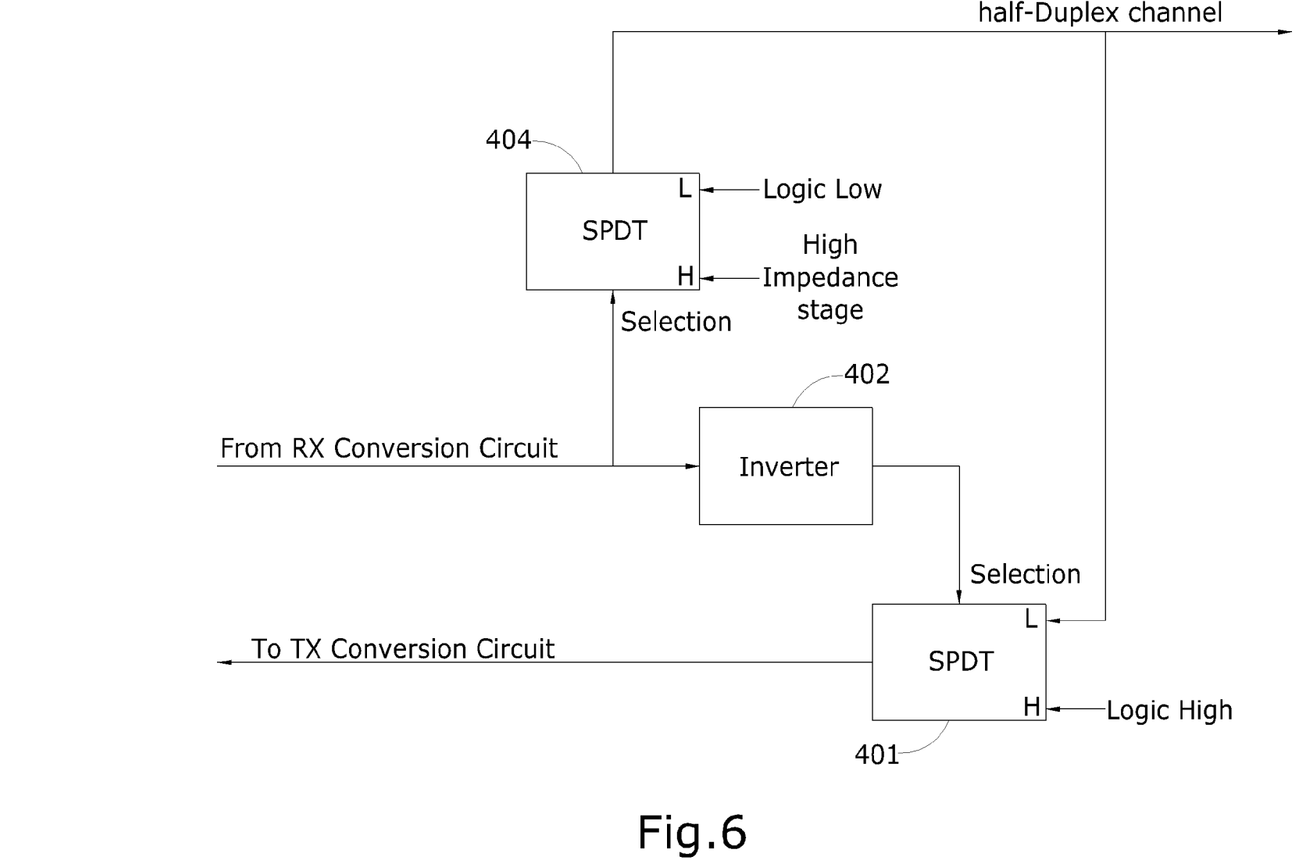
FIG. 6 is a diagram showing a constructional view of the third embodiment of a direction detector circuit.

FIG. 6 shows the constructional structure of the third embodiment of the direction detector circuits 301, 302, 303 and 304. Compared to FIG. 5, the selection pin of the SPDT (first SPDT) 404 is connected to the output of the RX data conversion circuit to determine the common pin of the SPDT 404 to be connected to L or H pin. The L pin of the SPDT 404 is connected to logic low; the H one is connected to be a high impedance stage and the common pin is connected to a half-duplex channel. The SPDT (second SPDT) 401 is provided for receiving the data from the RX data conversion circuit through the inverter 402 to be the selection signal to determine the input of the TX data conversion circuit which is from the bidirectional channel or logic high.

Figure 7:
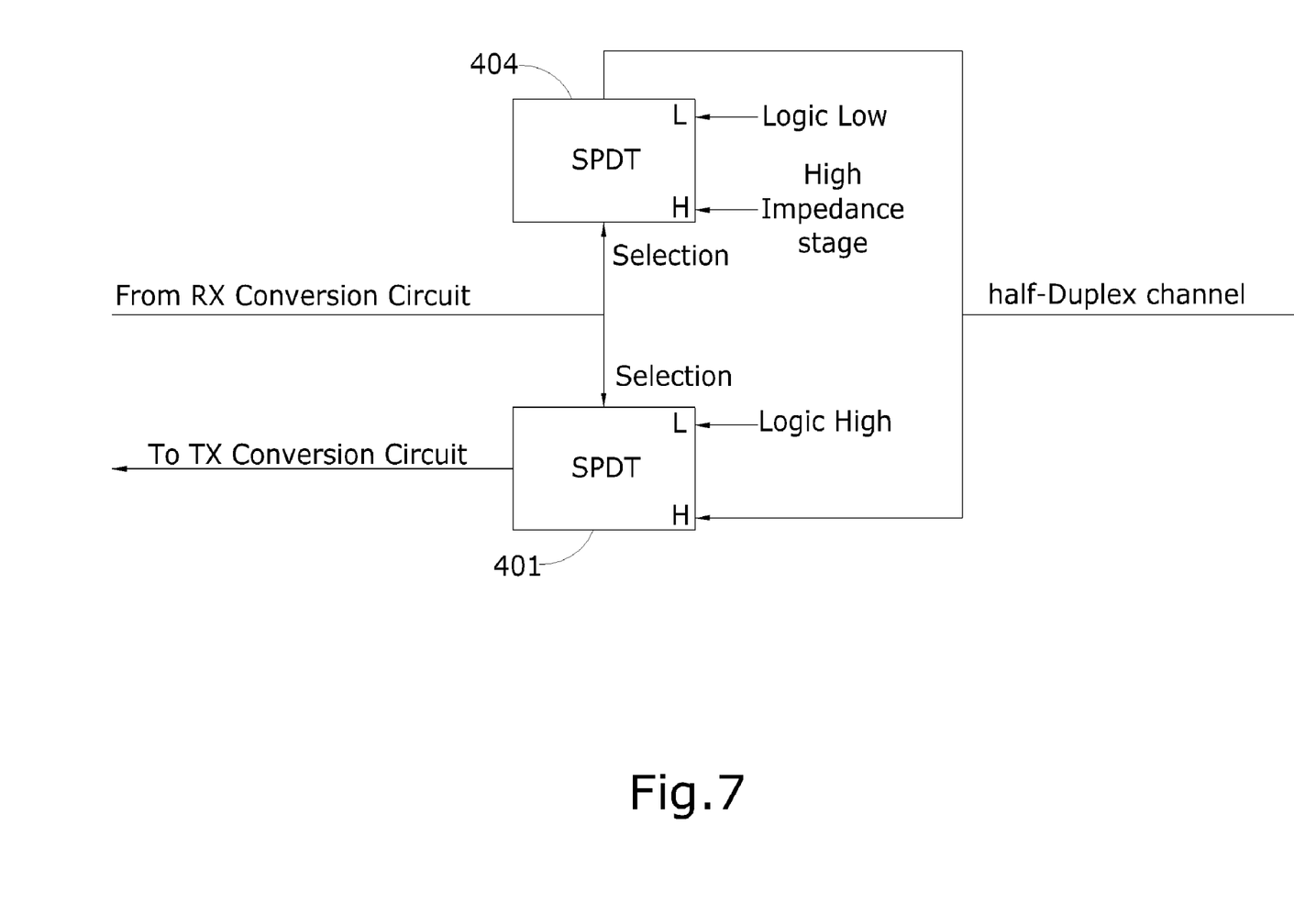
FIG. 7 is a diagram showing a constructional view of the fourth embodiment of a direction detector circuit.

FIG. 7 shows the constructional structure of the fourth embodiment of the direction detector circuits 301, 302, 303 and 304. In this embodiment, there are only two SPDTs in the circuit. As shown in FIG. 7, the selection pins of the SPDT (first SPDT) 404 and the SPDT (second SPDT) 401 are both connected to the output of the RX data conversion circuit. The L pin of the SPDT 404 is connected to logic low; the H one is connected to be a high impedance stage and the common pin of the SPDT 404 is connected to the half-duplex channel. In addition, the L pin of the SPDT 401 is connected to logic high; the H one is connected to the half-duplex channel and the common pin of the SPDT 401 is connected to the input of the TX data conversion circuit.

Figure 8:
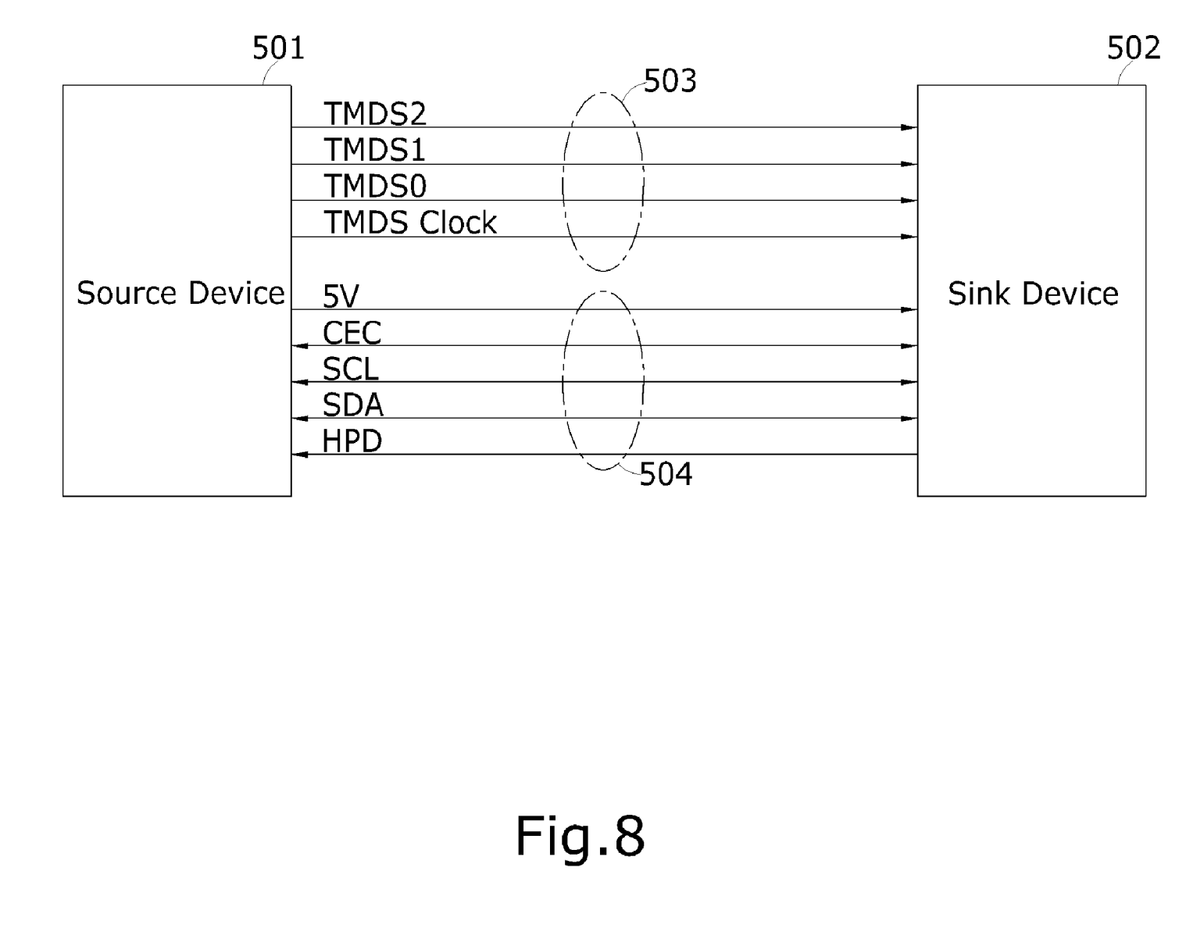
FIG. 8 is a diagram showing a constructional view of HDMI.

There is an example which can apply the invention. FIG. 8 shows the structure of HDMI interface. A source device 501 is a device with an HDMI output and a sink device 502 is a device with an HDMI input, respectively. The source device 501 transmits video data to the sink device 502 via TMDS (Transition Minimized Differential Signaling) channels 503: TMDS2, TMDS1, TMDS0 and TMDS clock; they are called "video data". There are unidirectional channels 504 to communicate with other device and control the transmission process: 5V, DDC (Display Data Channel) and HPD (Hot Plug Detect); they are called "control data". DDC channels are all bidirectional channels; they are CEC (Consumer Electronics Control), SCL (Serial Clock Line) and SDA (Serial Data Line). 5V and HPD channels are unidirectional channels. The control data will be implemented by the invention and be described in detail below.

Figure 9:
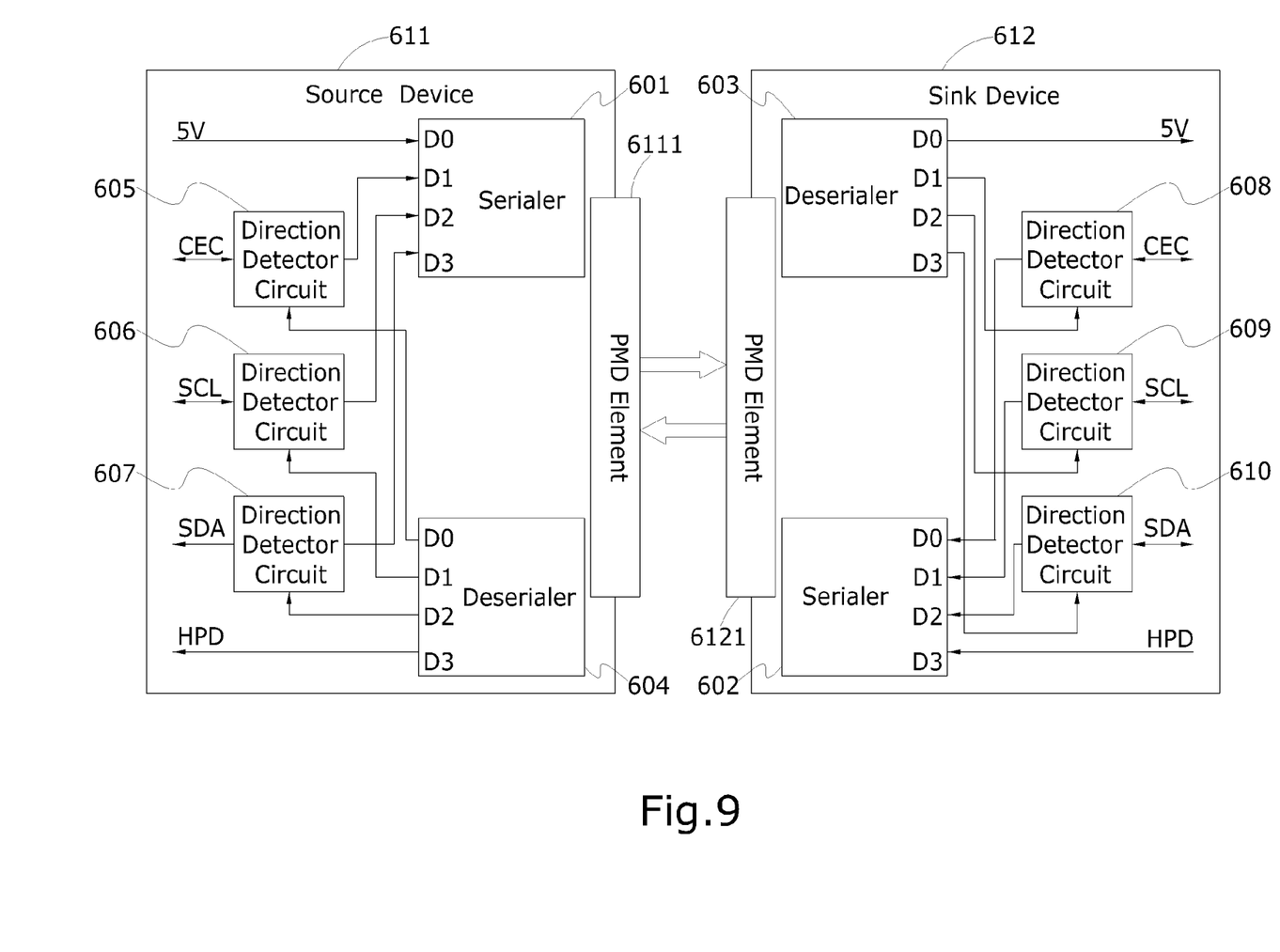
FIG. 9 is a diagram showing a constructional view of embodiment 1 of the invention for example in HDMI.

FIG. 9 shows the first embodiment which applies the invention. All bidirectional channels are passed through direction detector circuits 605, 606, 607, 608, 609 and 610 to determine the signal flow. The unidirectional ones are connected to serialers 601 and 602 or deserialers 603 and 604 directly due to the clear signal flow. Channels of a source device 611 channels are combined by the serialer 601 and transmit to deserialer 603 by a PMD element 6111; channels of a sink device channels are combined by serialer 602 and transmit to deserialer 604 by a PMD element 6121. The deserilaer 603 separates the signals to corresponding channels and pass bidirectional channels through direction detector circuits 608, 609 and 610 then connect to the bidirectional channels to avoid the loop which signals go to the serialer 602 to make for. The deserilaer 604 separates the signals to corresponding channels and pass bidirectional channels through the direction detector circuits 605, 606 and 607 then connect to the bidirectional channels to avoid the loop which signals go to the serialer 601 to make for. The unidirectional channels are connected to corresponding channels directly.

Figure 10:
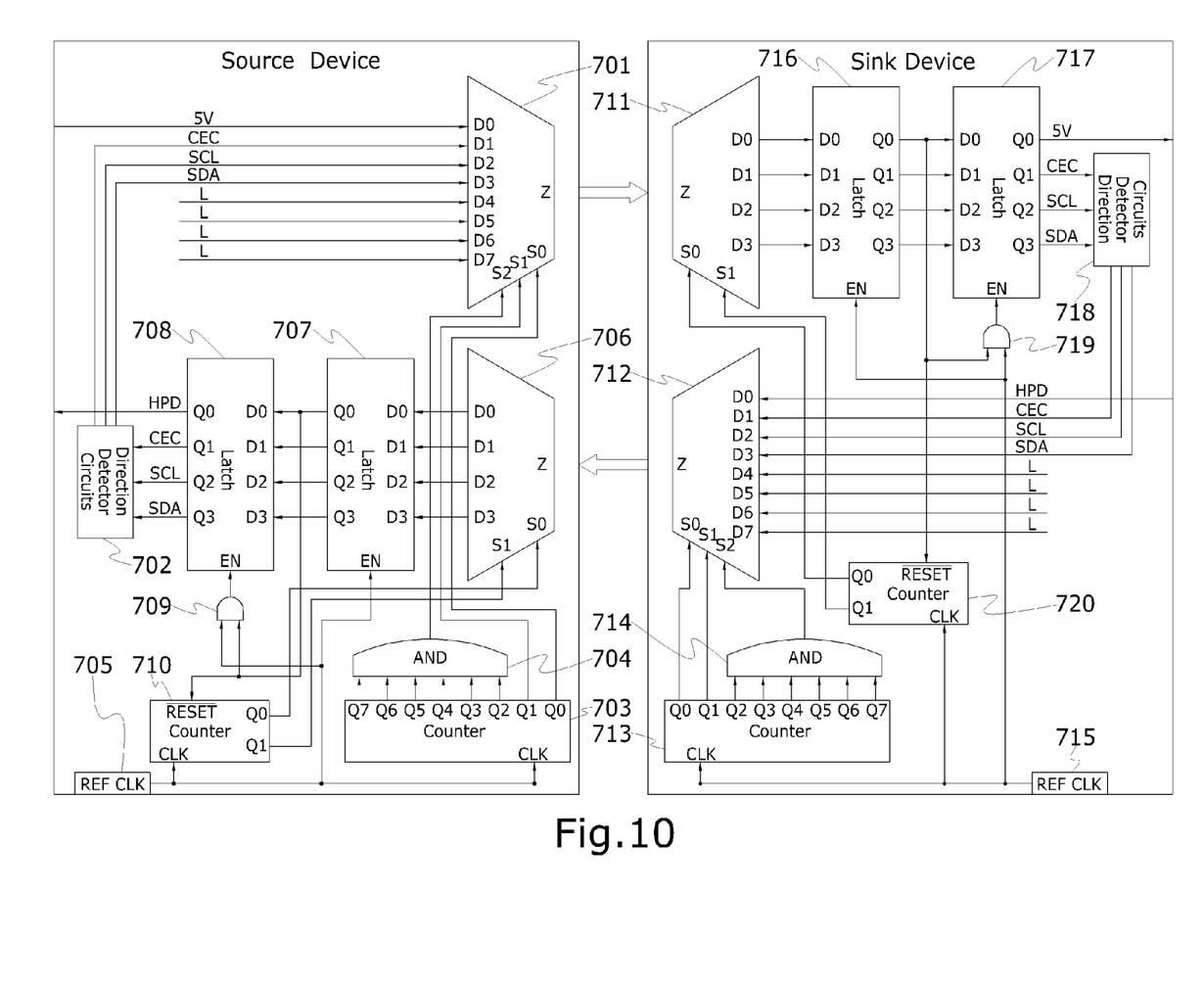
FIG. 10 is a diagram showing a constructional view of embodiment 2 of the invention for example in HDMI.

FIG. 10 shows the second embodiment which applies the invention. The PMD element is ignored for description now. In source side, bidirectional channels are passed through the direction detector circuits 702 to a multiplexer 701 and unidirectional channels are connected to the multiplexer 701 directly. The signal channels, 5V, CEC, SCL and SDA, are connected to the multiplexer 701 sequentially. Inputs D4 to D7 of the multiplexer 701 are all contacted to logic low for the alignment channels. A counter 703 is provided to be a binary counter. Outputs Q0 and Q1 of the counter 703 are connected to selection pins S0 and S1 of the multiplexer 701, respectively. Outputs Q2 to Q7 of the counter 703 are connected to a selection pin S2 of the multiplexer 701 through an AND gate 704. The multiplexer 701 transmits the data channels to the sink device 612 by the counter 703 counted by a reference clock 705.

A demultiplexer 706 received the data from sink device then output signals to a first latch 707 by selection pins S0 and S1 which are connected to a counter 710. The first latch 707 latches the output data by the reference clock 705. The first latch 707 outputs data to a second latch 708 directly. The enable of the second latch 708 is connected to the output of an AND gate 709 which combines the first channel of the first latch 707 and the reference clock 705. The second latch 708 outputs the data channels to the direction detector circuits 702 if they are bidirectional channels; the second latch 708 outputs the data channels to the corresponding circuits directly if they are unidirectional channels. The reset pin of the counter 710 is connected to the first channel of the first latch 707.

In sink side, bidirectional channels are passed through a direction detector circuit 718 to a multiplexer 712 and unidirectional channels are connected to the multiplexer 712 directly. The signal channels, 5V, CEC, SCL and SDA, are connected to the multiplexer 712 sequentially. Inputs D4 to D7 of the multiplexer 712 are all contacted to logic low for the alignment channels. The counter 713 is provided to be a binary counter; outputs Q0 and Q1 of a counter 713 are connected to selection pins S0 and S1 of the multiplexer 712, respectively. Outputs Q2 to Q7 of the counter 713 are connected to a selection pin S2 of the multiplexer 712 through a AND gate 714. The multiplexer 712 transmits the data channels to source device by the counter 713 counted by a reference clock 715.

The demultiplexer 711 received the data from source device then output signals to a first latch 716 by selection pins S0 and S1 which are connected to a counter 720. The first latch 716 latches the output data by the reference clock 715. The first latch 716 outputs data to a second latch 717 directly. The enable of the second latch 717 is connected to the output of an AND gate 719 which combines the first channel of the first latch 716 and the reference clock 715. The second latch 717 outputs the data channels to the direction detector circuit 718 if it is a bidirectional channel; the second latch 717 outputs the data channels to the corresponding circuits directly if they are unidirectional channels. The reset pin of the counter 720 is connected to the first channel of the first latch 716.

The alignment algorithm is be described by the source side below. The multiplexer 701 and the demultiplexer 706 need at least one logic high and one logic low channels to be the alignment channels to align all data channels. In this case, the 5V and HPD are the alignment channels because they are always high if the source and sink devices are linking. The multiplexer 701 will transmit the D0 to D3 channels sequentially during the output of the counter 703 is from 0 to 251 (decimal). The multiplexer 701 will transmit alignment channels during the output of the counter 703 is from 252 to 255 (decimal). The signals will be sent to the sink device by the counter 703 counting.

Regarding receiving, the demultiplexer 706 will send out the receiving data that is from the sink device to the latch 707 by the counter 710 counting. The counter 710 will be reset if the first channel is not logic high to align the connection. The first latch 707 will keep the outputs of the demultiplexer 706 during the clock changed. The second latch 708 will keep the output channels during the alignment stage. The alignment channels can make sure the channels are aligned every a period.

According to the invention, a method of a bidirectional digital communication circuit connected to a Physical Medium Dependent (PMD) element performing to combine a plurality of bidirectional channels and a plurality of unidirectional channels for digital communication comprises the following steps: providing a RX data conversion mechanism, a TX data conversion mechanism and a direction detect mechanism for said one or more bidirectional channels and one or more unidirectional channels to communicate two systems thereby; obtaining detect signals for connecting the bidirectional channels to the direction detect mechanism to determine the signals are going to the TX data conversion mechanism or come from the RX data conversion mechanism; combining channels data to provide combined signals to the PMD element by the TX data conversion mechanism; and receiving signals from the PMD element by the RX data conversion mechanism to provide distributed signals to corresponding channels. Said distributed signals is formed the PMD element to corresponding channels. Said combines signals is formed the according channels to the PMD element. Said detect signal direction is sent to according channel. It should be noted that the TX data conversion mechanism can be a TX data conversion circuit, the RX data conversion mechanism can be a RX data conversion circuit, and the direction detect mechanism can be a direction detect circuit as described in the above-mentioned embodiments, but those skilled in the art will appreciate numerous modifications, improvement and substitutions that will serve the same functions.

Although the invention has been described with reference to the above example, it will be understood that modifications and variations are encompassed within the spirit and scope of the invention. Accordingly, the invention is limited only by the following claims.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A bidirectional digital communication circuit connected to a physical medium dependent (PMD) element performing to combine a plurality of bidirectional channels and a plurality of unidirectional channels for digital communication, comprising:
   at least one direction detector circuit connecting at least one of the bidirectional channels for controlling data flow of the bidirectional channels,
   a TX data conversion circuit connecting the direction detector circuit and/or connecting at least one of the unibidirectional channels for inputting data therefrom, wherein the PMD element transmits the above data to and from a communication medium, and
   a RX data conversion circuit connecting the direction detector circuit and/or connecting at least another one of the unibidirectional channels for separating data thereto, wherein the PMD element receives the above data to and from a communication medium.

2. The bidirectional digital communication circuit according to claim 1, wherein the direction detector circuit controlling the data flow comprises an inverter for receiving the data from the RX data conversion circuit, a driver stage for outputting the signal from the inverter to the bidirectional channel, and a Single Pole Double Through (SPDT) for receiving the data from the RX data conversion circuit through the inverter to be a selection signal to determine the input of the TX data conversion circuit.

3. The bidirectional digital communication circuit according to claim 2, wherein the inverter is a digital inverter, the driver stage comprises a pull-up resistor and a Field Effect Transistor (FET) or a Bipolar Junction Transistor (BJT).

4. The bidirectional digital communication circuit according to claim 1, wherein the direction detector circuit controlling the data flow comprises an inverter for receiving the data from the RX data conversion circuit, a first SPDT and a second SPDT; the first SPDT is provided for outputting the data by the selection signal from the inverter to the bidirectional channel, the second SPDT is provided for receiving the data from the RX data conversion circuit through the inverter to be the selection signal to determine the input of the TX data conversion circuit.

5. The bidirectional digital communication circuit according to claim 4, wherein the first SPDT is connected to the output of the inverter to decide a common pin of the SPDT to be connected to L (Low) or H (High) pin of the first SPDT, the L pin of the first SPDT is connected to be a high impedance stage, the H one is connected to logic low and the common pin of the first SPDT is connected to the bidirectional channel, and the second SPDT is provided for receiving the data from the RX data conversion circuit through the inverter to be the selection signal to determine the input of the TX data conversion circuit which is from the bidirectional channel or logic high.

6. The bidirectional digital communication circuit according to claim 4, wherein the selection pin of the first SPDT is connected to the output of the RX data conversion circuit to decide the common pin of the first SPDT to be connected to L or H pin of the first SPDT, the L pin of the first SPDT is connected to logic low, the H one is connected to be a high impedance stage and the common pin of the first SPDT is connected to the bidirectional channel; and the second SPDT is provided for receiving the data from the RX data conversion circuit through the inverter to be the selection signal to determine the input of the TX data conversion circuit which is from the bidirectional channel or logic high.

7. The bidirectional digital communication circuit according to claim 1, wherein the direction detector circuit controlling the data flow comprises a first SPDT and a second SPDT, the selection pins of the first SPDT and the second SPDT are both connected to the output of the RX data conversion circuit, the L pin of the first SPDT is connected to logic low and the H one is connected to be a high impedance stage, and the common pin of the first SPDT is connected to the bidirectional channel; the L pin of the second SPDT is connected to logic high and the H one is connected to the bidirectional channel and the common pin of the second SPDT is connected to the TX data conversion circuit.

8. The bidirectional digital communication circuit according to claim 1, wherein the number of the direction detector circuit is depending on the number of bidirectional channels.

9. The bidirectional digital communication circuit according to claim 1, wherein said TX data conversion circuit is a serialer or a multiplexer with alignment circuit.

10. The bidirectional digital communication circuit according to claim 9, wherein said the multiplexer with alignment circuit comprises the multiplexer, at least one binary counter and at least one AND gate.

11. The bidirectional digital communication circuit according to claim 9, wherein the multiplexer with alignment circuit is applying at least one logic high and at least one logic low channels to make the channels alignment.

12. The bidirectional digital communication circuit according to claim 1, wherein said RX data conversion circuit is a deserialer or a demultiplexer with alignment circuit.

13. The bidirectional digital communication circuit according to claim 12, wherein said demultiplexer with alignment circuit comprises the demultiplexer, at least one binary counter, at least one AND gate and at least one latch.

14. The bidirectional digital communication circuit according to 12, wherein the demultiplexer with alignment circuit is applying at least one logic high and at least one logic low channels to make the channels alignment.

15. The bidirectional digital communication circuit according to claim 1, at least one of the bidirectional channels is a half-duplex channel.

16. A method of a bidirectional digital communication circuit connected to a physical medium dependent (PMD) element performing to combine a plurality of bidirectional channels and a plurality of unidirectional channels for digital communication comprising:
   providing a RX data conversion mechanism, a TX data conversion mechanism and a direction detect mechanism for said one or more bidirectional channels and one or more unidirectional channels to communicate two systems thereby;
   obtaining detect signals for connecting the bidirectional channels to the direction detect mechanism to determine the signals are going to the TX data conversion mechanism or coming from the RX data conversion mechanism;
   combining channels data to provide combined signals to the PMD element by the TX data conversion mechanism; and
   receiving signals from the PMD element by the RX data conversion mechanism to provide distributed signals to corresponding channels.

17. The method according to claim 16, wherein said distributed signals are formed the PMD element to corresponding channels.

18. The method according to claim 16, wherein said combined signals are formed according channels to the PMD element.

19. The method according to claim 16, wherein said detected signal direction is sent to determine the signal flow.

* * * * *